(12) United States Patent
Liu et al.

(10) Patent No.: US 11,129,133 B2
(45) Date of Patent: Sep. 21, 2021

(54) TERMINAL PAGING METHOD, DEVICE AND SYSTEM

(71) Applicant: Guangdong OPPO Mobile Telecommunications Corp., Ltd., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 15 days.

(21) Appl. No.: 16/606,638

(22) PCT Filed: Apr. 26, 2017

(86) PCT No.: PCT/CN2017/082001
§ 371 (c)(1),
(2) Date: Oct. 18, 2019

(87) PCT Pub. No.: WO2018/195802
PCT Pub. Date: Nov. 1, 2018

(65) Prior Publication Data
US 2021/0120525 A1    Apr. 22, 2021

(51) Int. Cl.
*H04W 68/02* (2009.01)
*H04W 76/27* (2018.01)
(Continued)

(52) U.S. Cl.
CPC ......... *H04W 68/02* (2013.01); *H04W 68/005* (2013.01); *H04W 76/27* (2018.02); *H04W 92/045* (2013.01)

(58) Field of Classification Search
CPC ... H04W 68/02; H04W 76/27; H04W 68/005; H04W 92/045; H04W 88/04; H04B 7/26
See application file for complete search history.

(56) References Cited

U.S. PATENT DOCUMENTS

| 8,213,396 | B1 | 7/2012 | Oroskar et al. |
| 2017/0142686 | A1 | 5/2017 | Zhang |

(Continued)

FOREIGN PATENT DOCUMENTS

| CN | 103857036 A | 6/2014 |
| CN | 104812069 A | 7/2015 |

(Continued)

OTHER PUBLICATIONS

3GPP TSG RAN WG2 Meeting #96 R2-167880; Reno, Nevada, USA, Nov. 14-18, 2016.

(Continued)

*Primary Examiner* — Diane D Mizrahi
(74) *Attorney, Agent, or Firm* — Young Basile Hanlon & MacFarlane, P.C.

(57) ABSTRACT

The present disclosure discloses a method, device, and system for paging a terminal. The method includes: a core network device determines a relay device corresponding to a terminal to be paged, and sends a paging request message to an access network device corresponding to the relay device, so that the access network device sends paging information to the relay device and the relay device relays the paging information to a terminal.

7 Claims, 6 Drawing Sheets

(51) Int. Cl.
*H04W 68/00* (2009.01)
*H04W 92/04* (2009.01)

(56) References Cited

U.S. PATENT DOCUMENTS

| | | | |
|---|---|---|---|
| 2019/0028962 A1* | 1/2019 | Chun | H04W 76/10 |
| 2020/0178343 A1* | 6/2020 | Kim | H04W 76/18 |

FOREIGN PATENT DOCUMENTS

| | | |
|---|---|---|
| EP | 2426960 A1 | 3/2012 |
| JP | 2012525737 A | 10/2012 |
| WO | 2010124458 A1 | 11/2010 |
| WO | 2016019528 A1 | 2/2016 |

OTHER PUBLICATIONS

3GPP TSG RAN WG2 Meeting #96 R2-168170; Reno, Nevada, USA, Nov. 14-18, 2016.
3GPP TSG RAN WG2 Meeting #96 R2-168398; Reno, Nevada, USA, Nov. 14-18, 2016.
3GPP TSG RAN WG2 Meeting #97bis R2-1703470; Spokane, USA, Apr. 3-7, 2017.
Extended EP Search Report Application 17906880.4 dated Feb. 27, 2020.
Communication pursuant to Article 94(3) EPC Examination for EP Application 17906880.4 dated Nov. 10, 2020.
Korean Office Action with English Translation for KR Application 10-2019-7032586 dated Nov. 25, 2020.
3GPP TS 36.304 V13.0.0 (Dec. 2015); 3rd Generation Partnership Project; Technical Specification Group Radio Access Network; Evolved Universal Terrestrial Radio Access (E-UTRA); User Equipment (UE) procedures in idle mode (Release 13).
3GPP TS 23.303 V13.2.0 (Dec. 2015); 3rd Generation Partnership Project; Technical Specification Group Services and System Aspects; Proximity-based services (ProSe); Stage 2 (Release 13).
India Office Action for in Application 201917044855 dated Jan. 29, 2021. (7 pages).
Summons to attend oral proceedings pursuant to Rule 115(1) EPC for EP Application 17906880.4 dated Jun. 16, 2021. (5 pages).
Japanese Office Action with English Translation for JP Application 2019-556273 dated May 21, 2021. (12 pages).

* cited by examiner

TERMINAL PAGING METHOD, DEVICE AND SYSTEM

CROSS-REFERENCE TO RELATED APPLICATION(S)

This application is a 371 application of International Application No. PCT/CN2017/082001, filed on Apr. 26, 2017, the entire disclosure of which is hereby incorporated by reference.

TECHNICAL FIELD

The present disclosure relates to a wireless network technology, in particular to a method, device, and system for paging a terminal.

BACKGROUND

An International Mobile Communications-Advanced (IMT-Advanced) system adopts a Carrier Aggregation (CA) technology, an enhanced Multiple-Input Multiple-Output (MIMO) antenna technology, a Coordinated Multiple Points Transmission/Reception (CoMP) technology and a relay technology and so on. It further increases a system capacity and improves a data rate and user experience of cell edge users on a basis of an original cellular communication system.

However, the IMT-Advanced system still has problems in aspects of coverage and capacity and so on, due to limitations of cell coverage and the way of providing services which both take a Base Station (BS) as a center in the cellular communication system.

A Device-to-Device (D2D) technology refers to that neighboring terminals can transmit data through a directly connected link in a short distance range without forwarding by a central node (i.e., a base station).

Researches show that the D2D technology has great advantages in saving resources, reducing interference and improving transmission efficiency, etc. Introduction of the D2D technology into the IMT-Advanced system will significantly improve a network structure, enhance coverage and increase system capacity, etc.

That is, the D2D technology can be introduced in a licensed band of the IMT-Advanced system to form a hybrid network in which the cellular communication and the D2D communication coexist. As shown in FIG. 1, it is a schematic diagram of a hybrid network in which the cellular communication and the D2D communication coexist.

Accordingly, terminals may communicate in two different modes, one is a cellular communication mode, i.e., terminals communicate through a base station, and the other is a D2D communication mode, i.e., terminals communicate directly through a D2D link. As shown in FIG. 1, in the hybrid network, some terminals are still in the cellular communication mode in which information forwarding and communication are performed through a base station, while some terminals are in the D2D communication mode in which data is transmitted directly.

In addition, a D2D relay may further be used for assisting the communication between a terminal and a base station, wherein the D2D communication mode may be applied between the terminal and the D2D relay, while the cellular communication mode may be applied between the D2D relay and the base station. The D2D relay receives and forwards data in a half-duplex mode and performs a mode switch in a process of reception and forwarding. As shown in FIG. 2, it is a schematic diagram of an existing network in which the D2D relay is introduced.

In the above scenario in which communication is assisted by the D2D relay, the terminal receives paging information from the network side through an air interface. If the terminal is within network coverage, this method is generally unproblematic. However, if the terminal is not within network coverage, it is likely that the terminal cannot receive the paging, thus causing a paging failure, i.e., reducing a paging success rate.

SUMMARY

In view of the above, the present disclosure provides a method, device, and system for paging a terminal. Specific technical solutions are as follows.

A method for paging a terminal includes: a core network device determines a relay device corresponding to a terminal to be paged; and the core network device sends a paging request message to an access network device corresponding to the relay device, so that the access network device sends paging information to the relay device and the relay device relays the paging information to the terminal.

A method for paging a terminal includes: an access network device receives a paging request message from a core network device; the access network device determines a relay device corresponding to the paging request message; and the access network device sends paging information to the relay device, so that the relay device relays the paging information to a terminal.

A method for paging a terminal includes: a relay device receives paging information from an access network device, wherein the paging information is sent to the relay device by the access network device after the access network device receives a paging request message from a core network device; and the relay device relays the paging information to a terminal.

A method for paging a terminal includes: a terminal receives paging information from a relay device, wherein the paging information is sent to the relay device by an access network device after the access network device receives a paging request message from a core network device.

A core network device includes a first processing unit and a second processing unit. The first processing unit is used for determining a relay device corresponding to a terminal to be paged. The second processing unit is used for sending a paging request message to an access network device corresponding to the relay device, so that the access network device sends paging information to the relay device and the relay device relays the paging information to the terminal.

An access network device includes a third processing unit and a fourth processing unit. The third processing unit is used for receiving a paging request message from a core network device and determining a relay device corresponding to the paging request message. The fourth processing unit is used for sending paging information to the relay device, so that the relay device relays the paging information to a terminal.

A relay device includes a fifth processing unit and a sixth processing unit. The fifth processing unit is used for receiving paging information from an access network device, wherein the paging information is sent to the relay device by the access network device after the access network device receives a paging request message from a core network device. The sixth processing unit is used for relaying the paging information to a terminal.

A terminal includes a seventh processing unit. The seventh processing unit is used for receiving paging information from a relay device, wherein the paging information is sent to the relay device by an access network device after the access network device receives a paging request message from a core network device.

A system for paging a terminal includes the core network device as described above, the access network device as described above, the relay device as described above, and the terminal as described above.

Based on the above description, it can be seen that with the solution of the present disclosure, when a terminal needs to be paged, the core network device may firstly determine the relay device corresponding to the terminal to be paged, and then send a paging request message to the access network device corresponding to the relay device. After that, the access network device may send paging information to the relay device, and the relay device relays the paging information to the terminal, i.e., the network side may page the terminal by means of the relay device.

DETAILED DESCRIPTION

To make a technical solution of the present disclosure more clearly understood, the solution of the present disclosure will be further explained with reference to accompanying drawings and implementations.

It is apparent that the described implementations are a part, but not all, of implementations of the present disclosure. Based on the implementations of the present disclosure, all other implementations obtained by a person of ordinary skill in the art without paying an inventive effort shall fall within the scope of the present disclosure.

Figure 3:
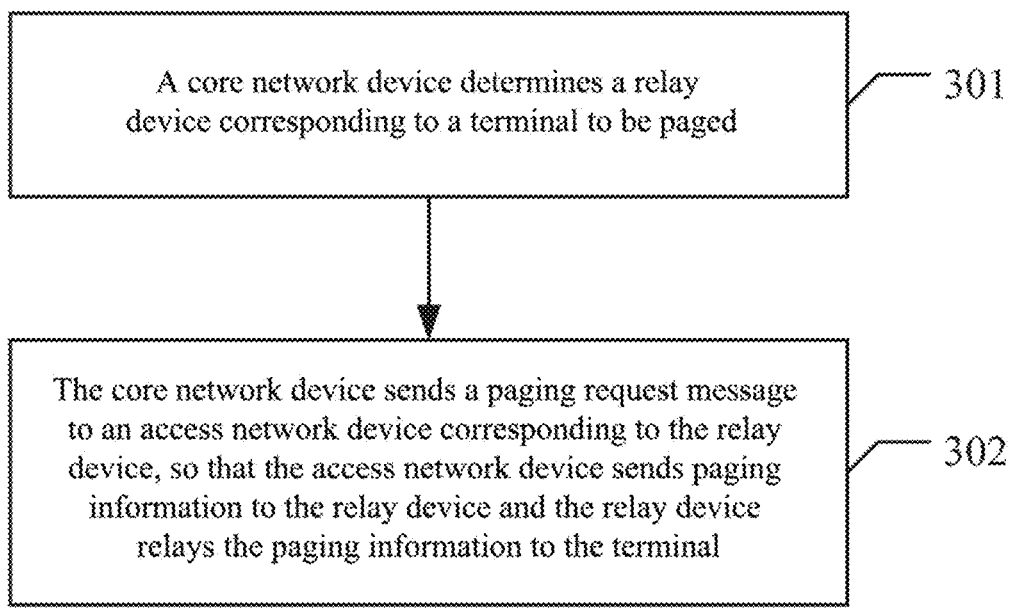
FIG. 3 is a flow chart of a method for paging a terminal according to a first implementation of the present disclosure.

FIG. 3 is a flow chart of a method for paging a terminal according to a first implementation of the present disclosure. As shown in FIG. 3, the method includes a specific implementation as follows.

In 301, a core network device determines a relay device corresponding to a terminal to be paged.

For example, when data of the terminal to be paged needs to be sent, the core network device needs to page the terminal.

Correspondingly, to page the terminal, the core network device needs to firstly determine the relay device corresponding to the terminal, and then may use the relay device to relay paging.

Before determining the relay device corresponding to the terminal, the core network device may firstly determine whether the terminal is within network coverage. If the terminal is not within network coverage, the core network device may further determine the relay device corresponding to the terminal. If the terminal is within network coverage, paging information may be sent to the terminal through an air interface according to the existing art.

How to determine whether the terminal is within network coverage belongs to the existing art.

How the core network device determines the relay device corresponding to the terminal may be determined according to actual requirements.

For example, the relay device corresponding to the terminal may be determined according to a stored corresponding relationship between the terminal and the relay device.

That is to say, the core network device may pre-store the corresponding relationship between different terminals and corresponding relay devices, so that a relay device corresponding to any terminal may be known by searching the stored content.

In 302, the core network device sends a paging request message to an access network device corresponding to the relay device, so that the access network device sends paging information to the relay device and the relay device relays the paging information to the terminal.

After determining the relay device corresponding to the terminal, the core network device may send the paging request message to an access network of the relay device, to request the access network to page the terminal.

That is, the core network device sends the paging request message to the access network device corresponding to the relay device, wherein the paging request message may carry paging information, such as identification information of the terminal, etc.

In addition, the core network device may send the paging request message through a specific S1 interface connection of the relay device, or may send the paging request message through an unspecific S1 interface connection of the relay device.

When the paging request message is sent through the unspecific S1 interface connection of the relay device, the paging request message may further carry identification information of the relay device.

The reason is that for the access network device, if the core network device sends the paging request message through the specific S1 interface connection of the relay device, the access network device may determine the relay device corresponding to the paging request message according to information of the specific S1 interface connection. But if the core network device sends the paging request message through the unspecific S1 interface connection of the relay device, the access network device cannot determine the relay device in the above way, so the identification information of the relay device needs to be added into the paging request message, so that the access network device can know the relay device corresponding to the paging request message.

After determining the relay device corresponding to the paging request message, the access network device may send paging information to the relay device, and then the relay device may relay the paging information to the terminal, thus achieving the purpose of paging the terminal.

Figure 4:
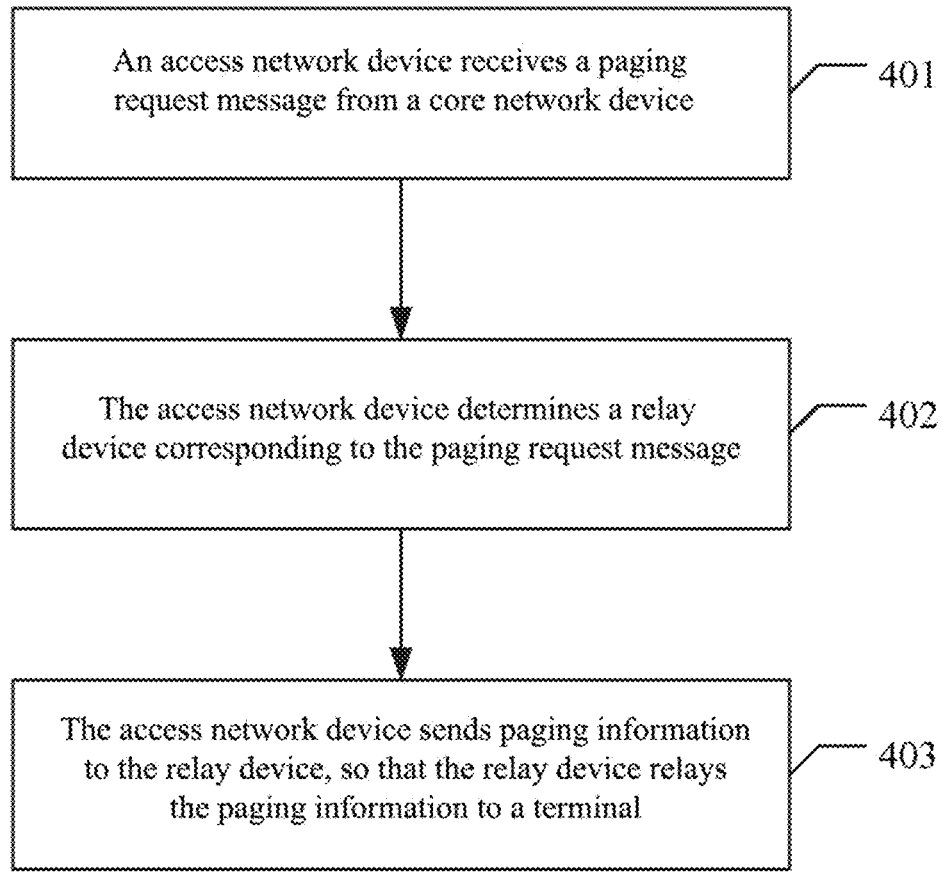
FIG. 4 is a flow chart of a method for paging a terminal according to a second implementation of the present disclosure.

FIG. 4 is a flow chart of a method for paging a terminal according to a second implementation of the present disclosure. As shown in FIG. 4, the method includes a specific implementation as follows.

In 401, an access network device receives a paging request message from a core network device.

When the core network device needs to page a terminal and determines that the terminal is not within network coverage, the core network device may determine the relay device corresponding to the terminal and send the paging request message to the access network device corresponding to the relay device.

The access network device may receive the paging request message through a specific S1 interface connection of the relay device, or may receive the paging request message through an unspecific S1 interface connection of the relay device.

When the paging request message is received through the unspecific S1 interface connection of the relay device, the paging request message further carries identification information of the relay device.

In 402, the access network device determines a relay device corresponding to the paging request message.

After receiving the paging request message, the access network device needs to further determine the relay device corresponding to the paging request message, i.e., the access network device determines which relay device needs to be used to relay paging.

Herein, when receiving the paging request message through the specific S1 interface connection of the relay device, the access network device may determine the relay device according to information of the specific S1 interface connection.

When receiving the paging request message through the unspecific S1 interface connection of the relay device, the access network device may determine the relay device according to identification information of the relay device carried in the paging request message.

In 403, the access network device sends paging information to the relay device, so that the relay device relays the paging information to a terminal.

The access network device may carry the paging information in a dedicated message and send the dedicated message to the relay device.

The dedicated message may refer to a Radio Resource Control (RRC) message or a Protocol Data Unit (PDU) message of Layer 2, etc.

The access network device carries the paging information in the dedicated message and sends the dedicated message to the relay device, requesting the relay device to relay the paging information of the terminal. Accordingly, the relay device will relay the obtained paging information to the terminal.

Figure 5:
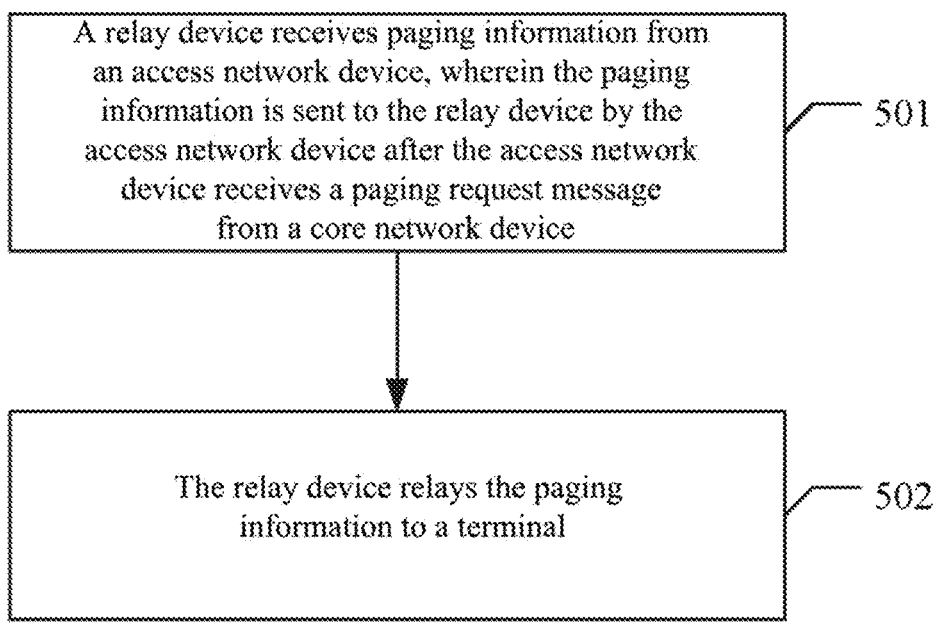
FIG. 5 is a flow chart of a method for paging a terminal according to a third implementation of the present disclosure.

FIG. 5 is a flow chart of a method for paging a terminal according to a third implementation of the present disclosure. As shown in FIG. 5, the method includes a specific implementation as follows.

In 501, a relay device receives paging information from an access network device, wherein the paging information is sent to the relay device by the access network device after the access network device receives a paging request message from a core network device.

After receiving the paging request message from the core network device, the access network device may carry the paging information in a dedicated message and send the dedicated message to the relay device corresponding to the paging information.

The dedicated message may be an RRC message or a PDU message, etc.

The relay device may perform a parsing processing or the like on the received dedicated message in a corresponding way, and discover/identify that the message is information sent to a terminal.

In 502, the relay device relays the paging information to a terminal.

Specifically, the relay device may relay the paging information to the terminal through a short distance communication technology suitable for the terminal.

For example, the relay device may relay the paging information to the terminal through the short distance communication technology such as a Bluetooth technology, or a Wi-Fi technology, etc.

Figure 6:
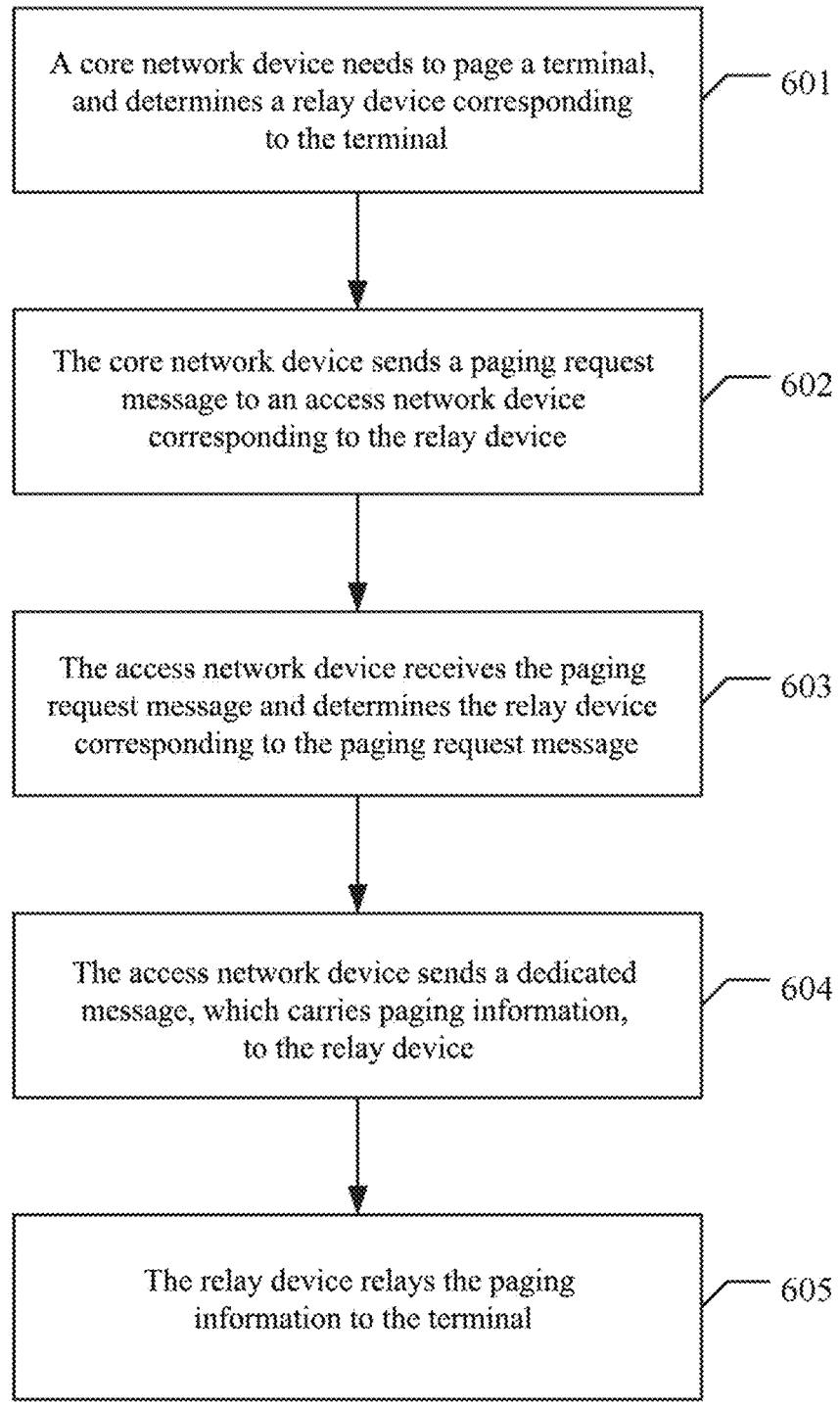
FIG. 6 is a flow chart of a method for paging a terminal according to a fourth implementation of the present disclosure.

Based on the above description, FIG. 6 is a flow chart of a method for paging a terminal according to a fourth implementation of the present disclosure. As shown in FIG. 6, the method includes a specific implementation as follows.

In 601, a core network device needs to page a terminal, and determines a relay device corresponding to the terminal.

For example, when data of the terminal to be paged needs to be sent, the core network device needs to page the terminal.

Correspondingly, to page the terminal, the core network device may firstly determine the relay device corresponding to the terminal, and then may use the relay device to relay paging.

How the core network device determines the relay device corresponding to the terminal may be determined according to actual requirements.

For example, the relay device corresponding to the terminal may be determined according to a stored corresponding relationship between the terminal and the relay device.

In 602, the core network device sends a paging request message to an access network device corresponding to the relay device.

The paging request message may carry paging information, such as identification information of the terminal, etc.

In addition, the core network device may send the paging request message through a specific S1 interface connection of the relay device, or may send the paging request message through an unspecific S1 interface connection of the relay device.

When the paging request message is sent through the unspecific S1 interface connection of the relay device, the paging request message may further carry identification information of the relay device.

In 603, the access network device receives the paging request message and determines the relay device corresponding to the paging request message.

The access network device may receive the paging request message through a specific S1 interface connection of the relay device, or may receive the paging request message through an unspecific S1 interface connection of the relay device.

When the paging request message is received through the unspecific S1 interface connection of the relay device, the paging request message further carries identification information of the relay device.

Herein, when receiving the paging request message through the specific S1 interface connection of the relay device, the access network device may determine the relay device according to information of the specific S1 interface connection.

When receiving the paging request message through the unspecific S1 interface connection of the relay device, the access network device may determine the relay device according to identification information of the relay device carried in the paging request message.

In 604, the access network device sends a dedicated message, which carries paging information, to the relay device.

The dedicated message may be an RRC message or a PDU message, etc.

In 605, the relay device relays the paging information to the terminal.

The relay device may relay the paging information to the terminal through a short distance communication technology. Which short distance communication technology is adopted may be determined according to actual requirements.

Figure 7:
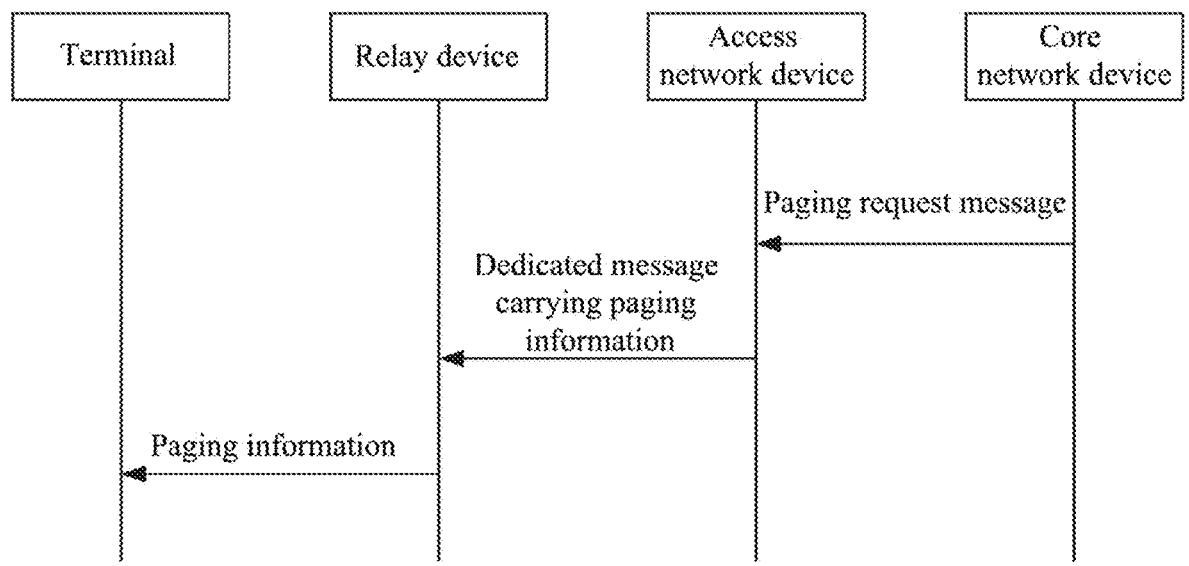
FIG. 7 is a schematic diagram of a message flow among a core network device, an access network device, a relay device and a terminal according to the present disclosure.

Based on the above description, FIG. 7 is a schematic diagram of a message flow among a core network device, an access network device, a relay device and a terminal according to the present disclosure.

In the above implementations, there is respective emphasis in the description of each implementation. For the part not detailed in an implementation, related description in other implementations may be referred to.

It can be seen that, by adopting the methods described in the above implementations, the network side may page the terminal by means of the relay device. As such, it can still be ensured that the terminal can receive the paging even under the condition in which the terminal has no network coverage as in the existing art, thereby improving the paging success rate.

Figure 1:
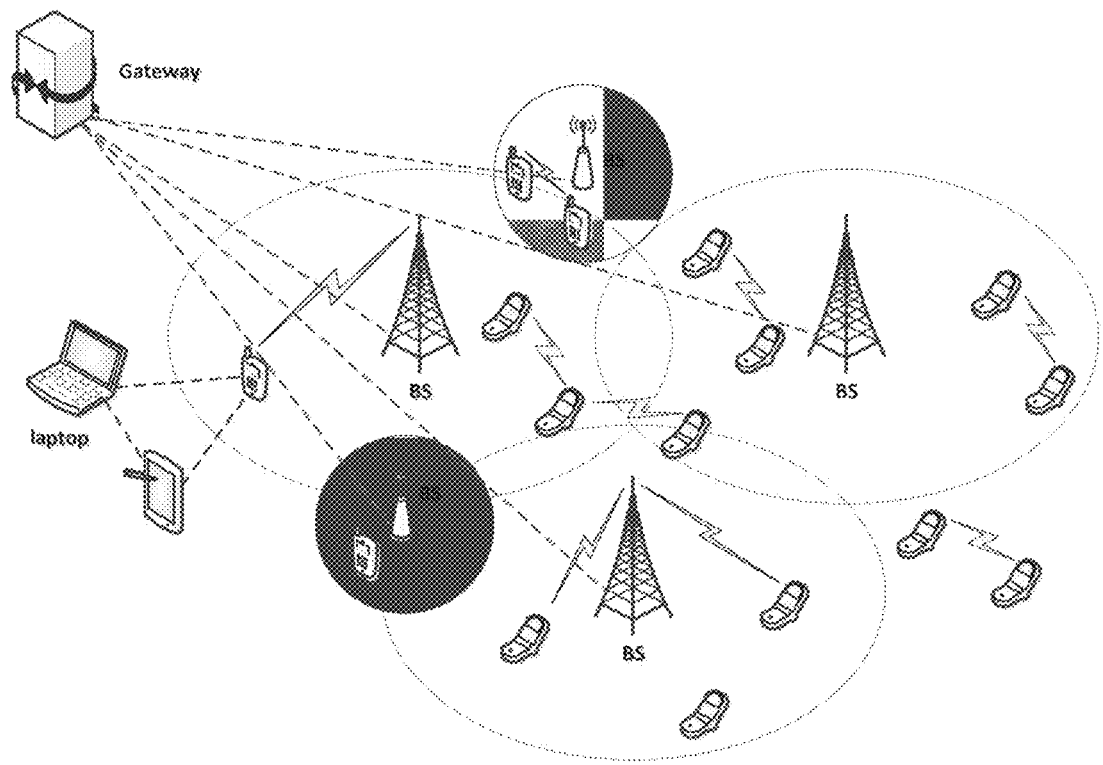
FIG. 1 is a schematic diagram of a hybrid network in which existing cellular communication and D2D communication coexist.
Figure 2:
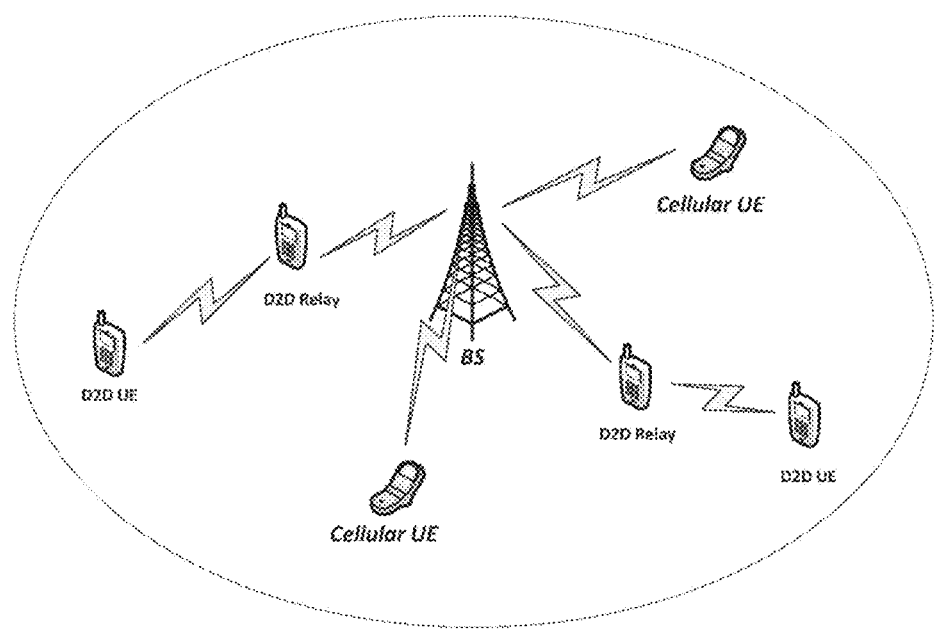
FIG. 2 is a schematic diagram of an existing network in which a D2D relay is introduced.

In addition, taking a scenario shown in FIG. 2 as an example, the terminal in the above implementations may be a D2D terminal (D2D UE) as shown in FIG. 2, and the relay device in the above implementations may be a D2D relay as shown in FIG. 2.

The above is the description of method implementations, and the solution of the present disclosure will be further described below through apparatus implementations.

Figure 8:
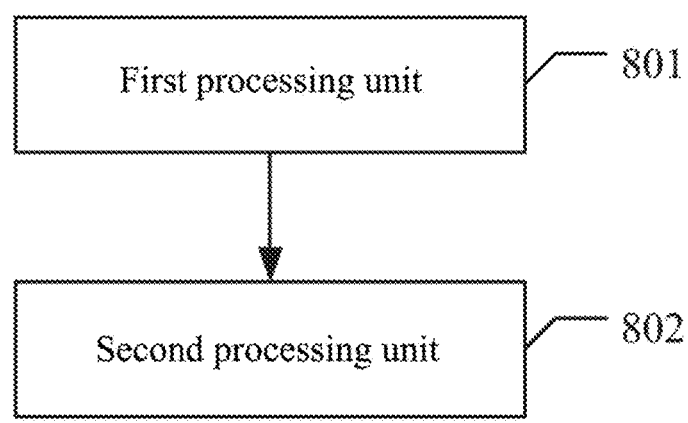
FIG. 8 is a schematic diagram of structure of a core network device according to an implementation of the present disclosure.

FIG. 8 is a schematic diagram of structure of a core network device according to an implementation of the present disclosure. As shown in FIG. 8, the core network device includes a first processing unit 801 and a second processing unit 802.

The first processing unit 801 is used for determining a relay device corresponding to a terminal to be paged.

The second processing unit 802 is used for sending a paging request message to an access network device corresponding to the relay device, so that the access network device sends paging information to the relay device and the relay device relays the paging information to the terminal.

When a terminal needs to be paged, the first processing unit 801 may firstly determine whether the terminal is within network coverage. If the terminal is not within network coverage, the first processing unit 801 may further determine the relay device corresponding to the terminal.

For example, the first processing unit 801 may determine the relay device corresponding to the terminal according to a stored corresponding relationship between the terminal and the relay device.

The first processing unit 801 may notify the second processing unit 802 of the determined relay device, and the second processing unit 802 may further send the paging request message to the access network device corresponding to the relay device.

Specifically, the second processing unit 802 may send the paging request message through a specific S1 interface connection of the relay device, or may send the paging request message through an unspecific S1 interface connection of the relay device.

When the paging request message is sent through the unspecific S1 interface connection of the relay device, the paging request message may further carry identification information of the relay device.

The reason is that for the access network device, if the second processing unit 802 sends the paging request message through the specific S1 interface connection of the relay device, the access network device may determine the relay device corresponding to the paging request message according to information of the specific S1 interface connection. But if the second processing unit 802 sends the paging request message through the unspecific S1 interface connection of the relay device, the access network device cannot determine the relay device in the above way, so the identification information of the relay device needs to be added into the paging request message, so that the access network device can know the relay device corresponding to the paging request message.

After determining the relay device corresponding to the paging request message, the access network device may send paging information to the relay device, and then the relay device may relay the paging information to the terminal, thus achieving the purpose of paging the terminal.

Figure 9:
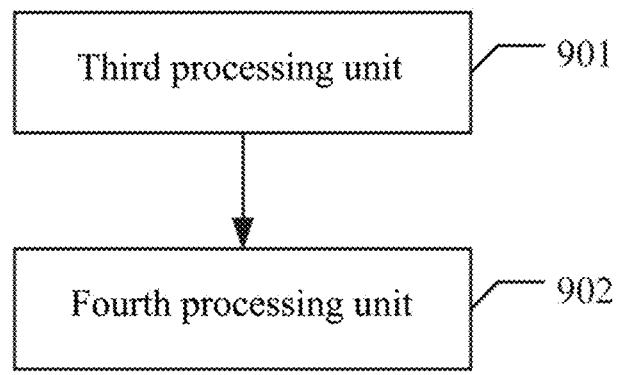
FIG. 9 is a schematic diagram of structure of an access network device according to an implementation of the present disclosure.

FIG. 9 is a schematic diagram of structure of an access network device according to an implementation of the present disclosure. As shown in FIG. 9, the access network device includes a third processing unit 901 and a fourth processing unit 902.

The third processing unit 901 is used for receiving a paging request message from a core network device and determining a relay device corresponding to the paging request message.

The fourth processing unit 902 is used for sending paging information to the relay device, so that the relay device relays the paging information to a terminal.

When the core network device needs to page a terminal and determines that the terminal is not within network coverage, the core network device may determine the relay device corresponding to the terminal and send the paging request message to an access network device corresponding to the relay device.

Accordingly, the third processing unit 901 receives the paging request message and determines the relay device corresponding to the paging request message.

The third processing unit 901 may receive the paging request message through a specific S1 interface connection of the relay device, or may receive the paging request message through an unspecific S1 interface connection of the relay device.

When the paging request message is received through the unspecific S1 interface connection of the relay device, the paging request message further carries identification information of the relay device.

Herein, when receiving the paging request message through the specific S1 interface connection of the relay device, the third processing unit 901 may determine the relay device according to information of the specific S1 interface connection.

When receiving the paging request message through the unspecific S1 interface connection of the relay device, the third processing unit 901 may determine the relay device according to identification information of the relay device carried in the paging request message.

The third processing unit 901 may notify the fourth processing unit 902 of the determined relay device, and the fourth processing unit 902 may send paging information to the relay device, so that the relay device relays the paging information to the terminal.

The fourth processing unit 902 may carry the paging information in a dedicated message and send the dedicated message to the relay device.

The dedicated message may be an RRC message or a PDU message, etc.

The fourth processing unit 902 carries the paging information in a dedicated message and sends the dedicated message to the relay device, requesting the relay device to relay the paging information of the terminal. Accordingly, the relay device will relay the obtained paging information to the terminal.

Figure 10:
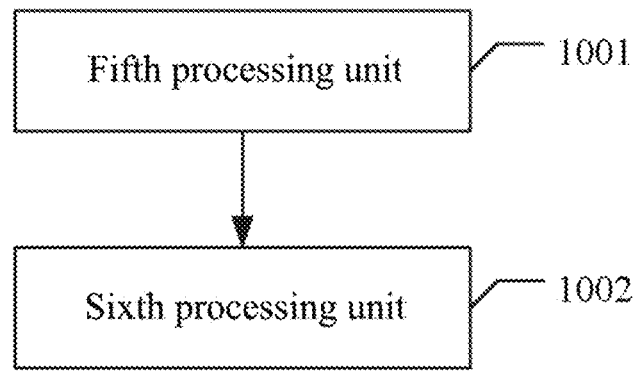
FIG. 10 is a schematic diagram of structure of a relay device according to an implementation of the present disclosure.

FIG. 10 is a schematic diagram of structure of a relay device according to an implementation of the present disclosure. As shown in FIG. 10, the relay device includes a fifth processing unit 1001 and a sixth processing unit 1002.

The fifth processing unit 1001 is used for receiving paging information from an access network device, wherein the paging information is sent to the relay device by the access network device after the access network device receives a paging request message from a core network device.

The sixth processing unit 1002 is used for relaying the paging information to a terminal.

After receiving the paging request message from the core network device, the access network device may carry the paging information in a dedicated message and send the dedicated message to the relay device corresponding to the paging information.

The dedicated message may be an RRC message or a PDU message, etc.

The fifth processing unit 1001 may perform a parsing processing or the like on the received dedicated message in a corresponding way, and discover/identify that the message is information sent to the terminal, and then the sixth processing unit 1002 relays the paging information to the terminal.

Specifically, the sixth processing unit 1002 may relay the paging information to the terminal through a short distance communication technology suitable for the terminal.

The present disclosure also discloses an implementation of a terminal, which may include a seventh processing unit for receiving paging information from a relay device, wherein the paging information is sent to the relay device by the access network device after the access network device receives a paging request message from a core network device.

The seventh processing unit may receive the paging information through a short distance communication technology.

The present disclosure also discloses a system for paging a terminal, which may include the core network device in the implementation as shown in FIG. 8, the access network device in the implementation as shown in FIG. 9, the relay device in the implementation as shown in FIG. 10, and the terminal as described above.

Please refer to the corresponding description in the above-described method implementations for the specific work flows of the above-described device and system implementations, which are not repeated here.

It can be seen that, by adopting the methods described in the above implementations, the network side may page the terminal by means of the relay device, so that it can still be ensured that the terminal can receive the paging even under the condition in which the terminal is not within network coverage as in the existing art, thereby improving a paging success rate.

In several implementations provided by the present disclosure, it should be understood that the disclosed devices and methods and the like may be implemented in other ways. For example, the device implementations described above are just examples. For example, division of units is just division according to logical functions, and other division methods may be adopted during actual implementation.

The units described as separate components may or may not be physically separated, and the component shown as a unit may or may not be a physical unit, i.e., it may be located in one place or may be distributed over multiple network units. Some or all of the units may be selected according to actual needs to achieve the purpose of solutions of the implementations of the present application.

In addition, various functional units in various implementations of the present disclosure may be integrated in one processing unit, or the various units may be physically present separately, or two or more units may be integrated in one unit. The integrated units can be implemented in the form of hardware or in the form of hardware plus software functional units.

The integrated units implemented in the form of software functional units may be stored in a computer readable storage medium. The above-mentioned software functional units are stored in a storage medium including several instructions for causing a computer device (which may be a personal computer, a server, or a network device and so on) or a processor to perform parts of acts of the methods described in various implementations of the present disclosure. The aforementioned storage media include U disk, mobile hard disk, read-only memory (ROM), random access memory (RAM), magnetic disk or optical disk, and other media capable of storing program codes.

The above description is only example implementations of the present disclosure, and is not intended to limit the present disclosure. Any modification, equivalent substitution, improvement and the like made within the spirit and principle of the present disclosure shall be included in the scope of protection of the present disclosure.

The invention claimed is:

1. A method for paging a terminal, comprising:
   determining, by a core network device, a relay device corresponding to a terminal to be paged;
   sending, by the core network device, a paging request message to an access network device corresponding to the relay device, enabling the access network device to send paging information to the relay device and the relay device to relay the paging information to the terminal,
   wherein the core network device sends the paging request message through an unspecific S1 interface connection of the relay device, and the paging request message carries identification information of the relay device.

2. The method according to claim 1, wherein,
   before determining, by the core network device, the relay device corresponding to the terminal to be paged, the method further comprises:

determining, by the core network device, whether the terminal is within network coverage;

determining, by the core network device, the relay device corresponding to the terminal when the core network device determines that the terminal is not within network coverage.

3. The method according to claim 1, wherein, determining, by the core network device, the relay device corresponding to the terminal to be paged comprises:

determining, by the core network device, the relay device corresponding to the terminal according to a stored corresponding relationship between the terminal and the relay device.

4. A relay device, comprising a processor and a transceiver; wherein the processor is used for receiving paging information from an access network device, wherein the paging information is sent to the relay device by the access network device after the access network device receives a paging request message from a core network device through an unspecific S1 interface connection of the relay device, wherein the paging request message carries identification information of the relay device; and the transceiver is used for relaying the paging information to a terminal.

5. The relay device according to claim 4, wherein, the transceiver is used for relaying the paging information to the terminal through a short distance communication technology.

6. A terminal, comprising a transceiver, wherein the transceiver is used for receiving paging information from a relay device, wherein the paging information is sent to the relay device by an access network device after the access network device receives a paging request message from a core network device through an unspecific S1 interface connection of the relay device, wherein the paging request message carries identification information of the relay device.

7. The terminal according to claim 6, wherein, the transceiver is used for receiving the paging information through a short distance communication technology.

* * * * *